Jan. 9, 1962     E. P. MORSE     3,016,491
PHASE DETECTOR HAVING NEGATIVE FEEDBACK
FOR NULL REBALANCING
Filed Jan. 20, 1958
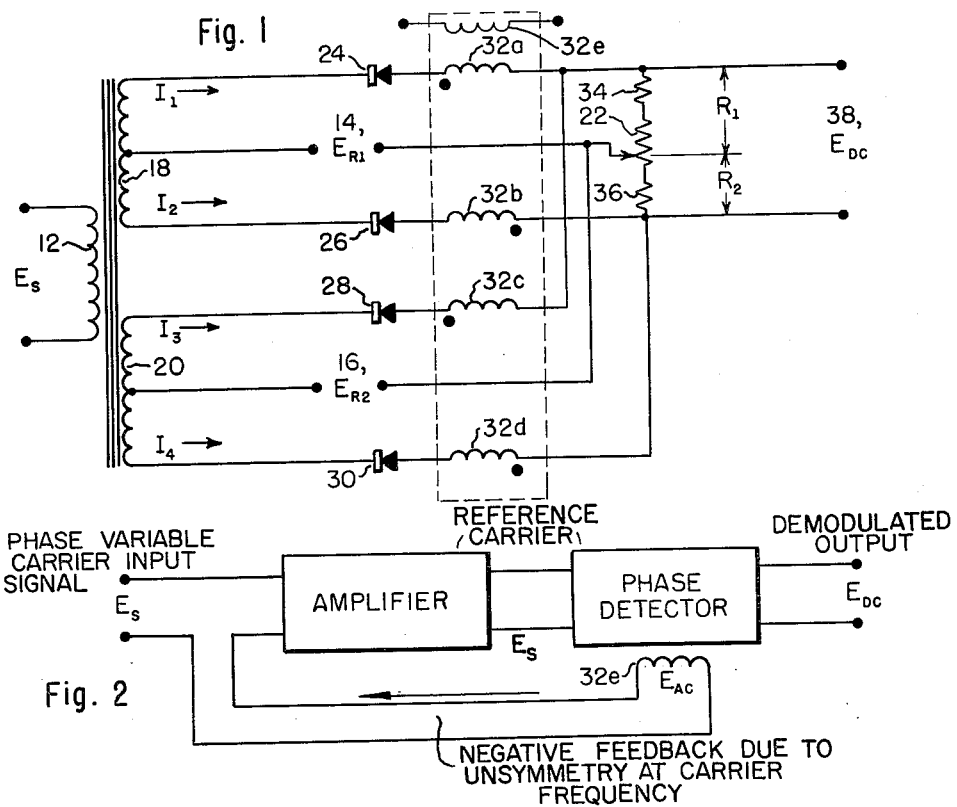
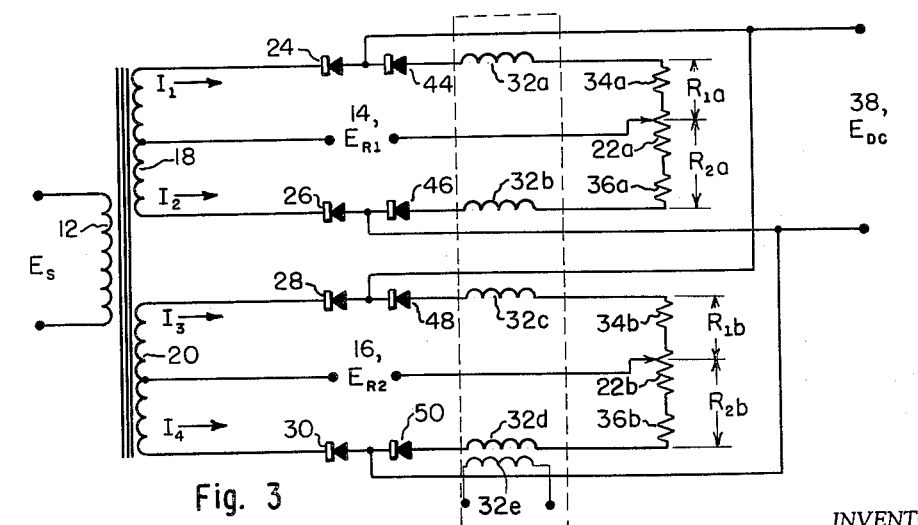
INVENTOR.
EDWARD PAUL MORSE
BY
ATTORNEYS 3,016,491
Patented Jan. 9, 1962

3,016,491
PHASE DETECTOR HAVING NEGATIVE FEED-BACK FOR NULL REBALANCING
Edward Paul Morse, Norwood, Mass., assignor, by mesne assignments, to Northrop Corporation, Beverly Hills, Calif., a corporation of California
Filed Jan. 20, 1958, Ser. No. 710,100
3 Claims. (Cl. 329—50)

This invention relates in general to null rebalancing circuit and in particular, to a phase detector circuit with selfrebalancing means for precision applications.

The concept of conversion of an alternating input voltage to a direct output voltage, the polarity of the direct voltage being determined by the phase of the alternating input voltage, is old and well-known. Usually, the alternating input voltage is compared with a reference voltage and the direct output voltage is of one polarity if the alternating input voltage is in phase with the reference voltage, and is of the opposite polarity if the alternating input voltage is out of phase with the reference voltage. Such circuits have numerous applications, quite often in so-called "servo systems," such as exist in all types of industrial transducers and in instruments where, for example, pressure or temperature control is desired. In these applications, quite commonly the alternating input signal is converted to a direct voltage which is then utilized to return the system to a null position, at which position the alternating input signal is zero.

In more recent years, a great demand has arisen for precision instruments, particularly in the field of missiles guidance. Gyroscopes sensitive to various departures of a missile from a desired course are utilized to drive pick-offs which in turn, provide an alternating signal of a magnitude determined by the degree of departure of the device from the desired course. This signal is passed through a phase-sensitive detector which converts the signal into a direct voltage which is utilized to return the missile to the desired course.

Fundamentally, there are no great differences between this type of operation and other servo system applications commonly used in the past. The most important consideration, however, is the degree of accuracy which is now required. For proper missile guidance, the required degree of accuracy is so great that it was previously thought to be unattainable. It is with such improvements of accuracy that the present invention is concerned.

The usefulness of circuits and instruments of such precision is not confined to the navigational field, but is also of importance in many processes where closer control is necessary or desired. Broadly then, it may be stated that the general object of the present invention is to improve the accuracy, linearity, and particularly the stability of apparatus embodying phase detectors whatever the application may be.

In general, the invention consists in a circuit wherein an alternating input signal is amplified and impressed upon a detector which provides a direct output voltage. However, in addition to the direct output voltage, there is also present in the output, a component of the alternating input signal. This alternating component is fed back to the input and, by means of the feedback, the null position of the output at zero input is unchanged and a high degree of accuracy and precision is obtained. For a better understanding of the present invention together with other and further objects, features, and advantages, reference should be made to the following description which should be read in connection with the accompanying drawing of a preferred embodiment of the invention wherein:

FIG. 1 is a schematic diagram of a primary full wave detector incorporating the principles of the present invention, FIG. 2 is a block diagram of a system embodying the present invention, and FIG. 3 is an alternate circuit utilizing principles of the of the present invention.

In FIG. 1, there is shown an input transformer having a primary winding 12 for receiving an alternating input signal. Two additional signals are provided as reference voltages from independent sources 14 and 16. The input transformer also includes a secondary winding 18 which has a center tap connected to the first reference signal source 14. Still another secondary winding 20 is provided and has a center tap connected to the second reference signal source 16. The other terminals of the reference signal sources 14 and 16 are connected together and return to the movable arm of a balance potentiometer 22. A diode rectifier 24 is connected to one end of the secondary 18 and a similar rectifier 26 is connected to the other end of the secondary 18. Similar rectifiers 28 and 30 are similarly connected to the ends of the secondary 20.

A second transformer 32 having multiple windings is incorporated in the circuit and the windings are magnetically coupled and polarized as shown. A winding 32a is connected to the rectifier 24; and a winding 32b is connected to the rectifier 26 in the upper half of the circuit diagram. In the lower half, a similar winding 32c is connected to the rectifier 28 and a winding 32d is connected to the rectifier 30. In addition, a fifth winding 32e is utilized to return a feedback signal to the input 12. The other end of the winding 32a is connected to one end of a resistor 34. In similar fashion, the other end of the winding 32b is connected to the end of a resistor 36. The winding 32c is commonly connected with the winding 32a to the end of the resistor 34. The winding 32d is commonly connected to the end of the resistor 36 with the winding 32b. The resistors 34 and 36 are connected together through the full resistance of the balance potentiometer 22. Output terminals 38 are provided for the extraction of the direct voltage.

In operation, the signal voltage $E_s$ from primary 12 and two isolated reference voltages $E_{r1}$ and $E_{r2}$ are supplied from the sources 14 and 16 which are independent of and isolated from the signal source but which are of the same frequency as the source and are identical, synchronous and in push-pull relationship. With the circuit illustrated, full wave detection is provided in a conventional manner. In addition, however, the circuit has the advantage of being balanced as shown. The output voltage, $E_{dc}$, is a function of the currents flowing and the resistance in each leg of the circuit. Considering the resistance in the upper half of the circuit to include the resistor 34 and the portion of the balance potentiometer 22 above the tap and, conversely, the resistance in the lower half of the circuit to include the resistor 36 and the portion of the balance potentiometer 22 below the tap, $$E_{dc} = (I_1 R_1 - I_2 R_2) + (I_3 R_1 - I_4 R_2)$$

With all components matched, $$I_1 = I_3 = \frac{E_r + E_s}{R_1} = \frac{E_r - E_s}{R_1} \quad \begin{array}{c}\text{In phase} \quad \text{Out of phase}\end{array}$$

$$I_2 = I_4 = \frac{E_r - E_s}{R_2} = \frac{E_r + E_s}{R_2}$$

These currents are equal to the average value of half-wave currents and a component of the alternating input signal is retained. With the windings 32a, 32b, 32c and 32d interposed in series in the various legs of the circuit, the windings being magnetically coupled and polarized as indicated by the dot convention, when $E_s=0$, no net voltage is induced in the magnetic circuit.

However, when a signal, $E_s$, is present, an unbalanced condition exists, and the net voltage induced is directly related to the amount of unbalance caused by $E_s$. The voltage thus induced is derived from the fifth winding, 32e, and is of sine wave configuration, one lobe being due to $I_1-I_2$ and the other lobe being due to $I_3-I_4$.

The amplitude of the voltage is a function of $E_s$ and of any dissimilarity in the components of the phase detector. The block diagram of FIG. 2 indicates the manner in which the voltage induced in the winding 32e is fed back to the input. Any drift on the part of the detector or error caused by dissimilarity of components is thus reduced by the feedback factor. By way of example, a drift of 1% and a feedback factor of 10 gives a drift of only $\frac{1}{10}$ of 1%. In FIG. 2, the input signal $E_s$ is indicated as being applied to an amplifier along with the alternating output component induced in the winding 32e. The output of the amplifier is fed to a phase detector such as is diagrammed in FIG. 1.

In FIG. 3, there is illustrated a system having the same detector analysis as FIG. 1. In this instance, however, the resistors 34 and 36 have been divided into two equal parts, 34a and 34b, and 36a and 36b. Also diodes 44, 46, 48 and 50 have been added, one in each leg of the circuit. These diodes prevent the currents $I_1$ and $I_2$ from flowing through the windings 32c and 32d and the currents $I_3$ and $I_4$ from flowing in the windings 32a and 32b. The output voltage $E_{dc}$, is now extracted from points between diodes and the same type of alternating component is present at the winding 32e.

However, with the circuit of FIG. 3, with an increasing load, the currents in the windings decrease as is desirable in negative feedback. Adverse output impedance effects of the output transformer and of the diodes are reduced by the feedback. In the circuit of FIG. 1, operation with constant direct current loads is quite satisfactory, but the currents in the windings increase with increasing loads.

Although what has been disclosed constitutes preferred embodiments of the present invention, many modifications within the scope of the invention will suggest themselves immediately to those skilled in the art. The invention should, therefore, be limited not to details shown but by the breadth of the appended claims.

What is claimed is:

1. In a phase detection system, the combination of a source of alternating input signals, an amplifier fed by said source, a phase detector fed by said amplifier, said phase detector including means for converting the amplified input signal fed thereto into an output signal containing alternating components related to said alternating input signal and direct components having a polarity determined by the phase of said alternating input signal, and means for feeding back to said amplifier said alternating components.

2. In combination with a phase detector, an input transformer having a primary winding for receiving an alternating input signal and a pair of secondary windings; each said secondary winding having a center tap; a source of reference voltage connected to each said center tap; a rectifier connected to each end of each said secondary winding; a feedback transformer having multiple windings, a feedback transformer winding being connected to each said rectifier; a first resistor, a balance potentiometer and a second resistor connected in series between a junction of two of said feedback transformer windings and a junction of two others of said feedback transformer windings, said sources of reference voltage being commonly connected to the tap of said balance potentiometer, and a fifth feedback transformer winding coupled to said primary winding of said input transformer.

3. In combination with a phase detector having a plurality of output legs and providing a direct output voltage which is a function of the currents flowing in each of said legs, a multi-winding transformer having a winding in each of said legs and a feedback winding, and a source of alternating signal voltage in series with said feedback winding, said windings in said legs being polarized to provide no net output when said currents are balanced, said feedback winding providing a correction voltage to return said currents to balance when said currents are unbalanced.

References Cited in the file of this patent

UNITED STATES PATENTS

| | | |
|---|---|---|
| 2,703,380 | Fraser | Mar. 1, 1955 |
| 2,727,999 | Rusler | Dec. 20, 1955 |
| 2,766,426 | Wilhelm | Oct. 9, 1956 |
| 2,833,921 | McCrory | May 6, 1958 |
| 2,862,182 | Posthumus | Nov. 25, 1958 |
| 2,871,349 | Shapiro | Jan. 27, 1959 |
| 2,890,331 | Norton | June 9, 1959 |
| 2,919,404 | Rock | Dec. 29, 1959 |